United States Patent
Vinton (10) Patent No.: US 9,487,157 B1
(45) Date of Patent: Nov. 8, 2016

(54) VEHICLE DISPLAY ASSEMBLY INCLUDING AN ENERGY ABSORPTION ELEMENT

(71) Applicant: Ford Global Technologies, LLC, Dearborn, MI (US)

(72) Inventor: Jeffrey Steven Vinton, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 14/795,992

(22) Filed: Jul. 10, 2015

(51) Int. Cl.
- *G06F 1/16* (2006.01)
- *B60R 11/02* (2006.01)
- *B60N 2/64* (2006.01)
- *B60R 11/00* (2006.01)

(52) U.S. Cl.
CPC ............. *B60R 11/0229* (2013.01); *B60N 2/64* (2013.01); *B60R 2011/0015* (2013.01); *B60R 2011/0082* (2013.01); *B60R 2011/0276* (2013.01); *B60R 2011/0294* (2013.01)

(58) Field of Classification Search
CPC . B60R 21/00; B60R 21/0286; B60R 21/055; B60R 2021/065; B60R 2021/23153
See application file for complete search history.

(56) References Cited

U.S. PATENT DOCUMENTS

| | | | | |
|---|---|---|---|---|
| 2,859,048 A * | 11/1958 | Munn | ...................... | B60R 21/16 280/733 |
| 3,198,543 A * | 8/1965 | Presunka | ................ | B60R 21/02 280/751 |
| 4,252,341 A * | 2/1981 | Barecki | .................... | B60N 2/00 280/751 |
| 4,565,535 A * | 1/1986 | Tassy | ...................... | B60R 21/16 244/121 |
| 6,149,231 A * | 11/2000 | Wustholz | ................. | B60N 2/48 280/730.1 |
| 6,199,900 B1 * | 3/2001 | Zeigler | ................ | B60N 2/4829 280/730.2 |
| 7,597,393 B1 | 10/2009 | Tuccinardi et al. | | |
| 7,637,565 B2 * | 12/2009 | Kuno | ........................ | A47C 7/38 297/188.05 |
| 7,758,117 B2 * | 7/2010 | Chang | ................. | B60R 11/0235 297/217.1 |
| 7,959,226 B2 | 6/2011 | Hattori et al. | | |
| 9,352,839 B2 * | 5/2016 | Gehret | ................... | B60R 21/207 |
| 2002/0101067 A1 * | 8/2002 | Breed | ................... | B60N 2/0232 280/741 |
| 2004/0007906 A1 * | 1/2004 | Park | ...................... | B60N 2/4876 297/217.3 |
| 2009/0085383 A1 | 4/2009 | Hicks et al. | | |
| 2010/0090447 A1 * | 4/2010 | Deng | ..................... | B60R 21/214 280/730.1 |
| 2013/0009430 A1 * | 1/2013 | Islam | ...................... | B60R 21/04 297/216.1 |
| 2015/0202999 A1 * | 7/2015 | Jafri | .................... | B60R 11/0235 297/216.12 |

FOREIGN PATENT DOCUMENTS

| | | |
|---|---|---|
| KR | 100867708 | 11/2008 |
| WO | WO 2014031934 A1 | 2/2014 |

* cited by examiner

*Primary Examiner* — Anthony Q Edwards
(74) *Attorney, Agent, or Firm* — Frank MacKenzie; Bejin Bieneman PLC (57) ABSTRACT

A display assembly for a vehicle includes an electronic display and a rod coupled to the electronic display. A guide defines a slot which receives the rod. The rod is movable along the slot from a first position to a second position. An energy absorption element is disposed along the slot and is deformable by the rod when the rod moves from the first position to the second position. During a frontal impact of the vehicle, a head of an occupant may contact the display assembly and may move the rod from the first position to the second position, during which movement the energy absorption element absorbs energy.

20 Claims, 10 Drawing Sheets

VEHICLE DISPLAY ASSEMBLY INCLUDING AN ENERGY ABSORPTION ELEMENT

BACKGROUND

Display assemblies including electronic displays are becoming more prevalent in vehicles as customer demand for passenger entertainment increases. The electronic display offers visual access to information and entertainment, i.e. infotainment, and, for example, can be used to expand the display of hand held electronic devices for viewing stored movie playback, music videos, etc. The display assembly may be positioned to be viewed by occupants seated in a rear row of seats. For example, the display assembly may be mounted to a roof of the vehicle, e.g., an overhead flip-down display assembly, or may be mounted to a seat back.

Since the occupant of the rear row of seats may be seated closer to the display assembly, the occupant may contact the display assembly in a vehicle impact, e.g., a front end impact. As such, the display assembly may be designed to comply with Head Injury Criterion (HIC) testing standards. The HIC is a measure of the likelihood of head injury arising from an impact. The U.S. National Highway Traffic Safety Administration (NHTSA) utilizes the HIC as a tool for measuring head injury, and is a primary factor in determining the vehicle safety rating.

There remains an opportunity to design a display assembly that allows for the management of the energy that may result in a reduction of the impact energy transferred to the occupant.

DETAILED DESCRIPTION

Figure 1:
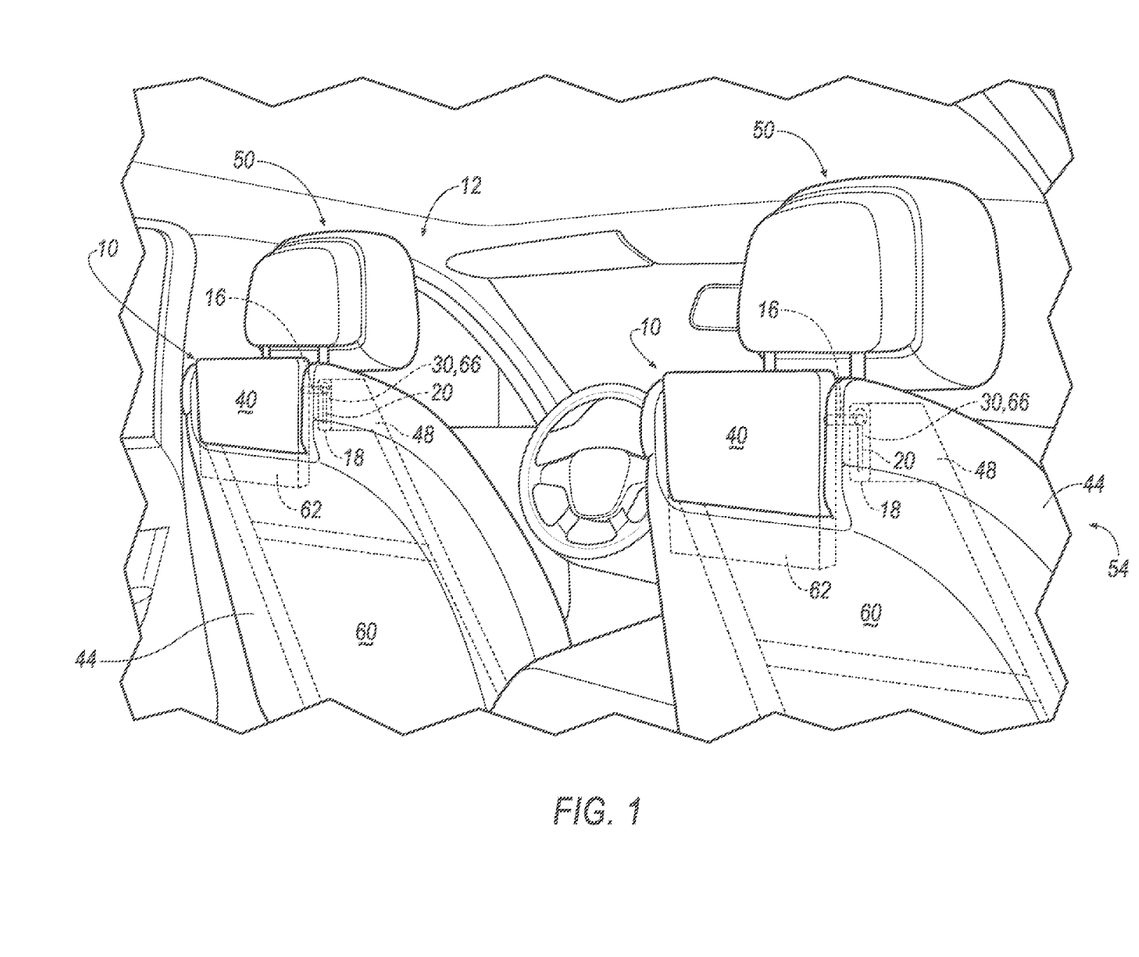
FIG. 1 is a perspective view of a portion of a vehicle including a seat back and a display assembly in a stowed position.
Figure 2:
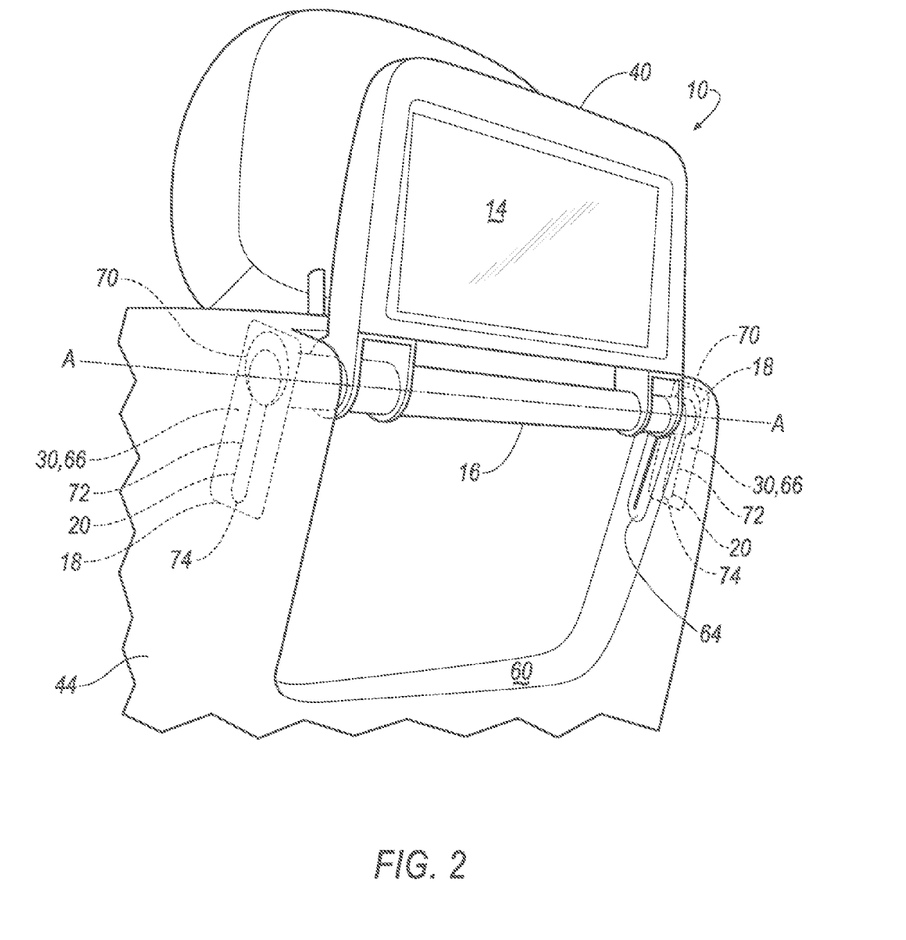
FIG. 2 is a perspective view of the seat back and the display assembly in a viewing position.
Figure 3:
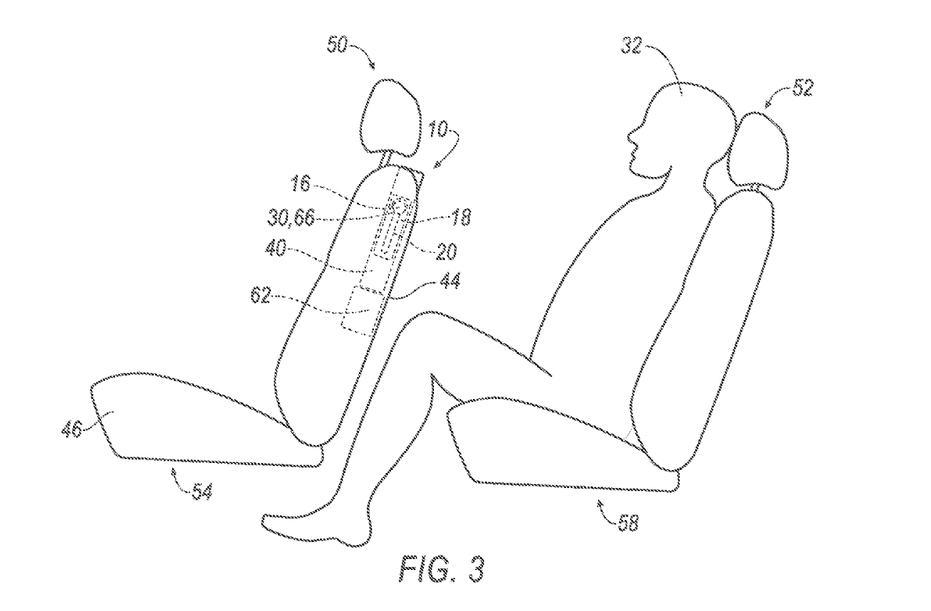
FIG. 3 is a side view of an occupant seated in front of the seat back with the display assembly shown in hidden lines in a first position.
Figure 4:
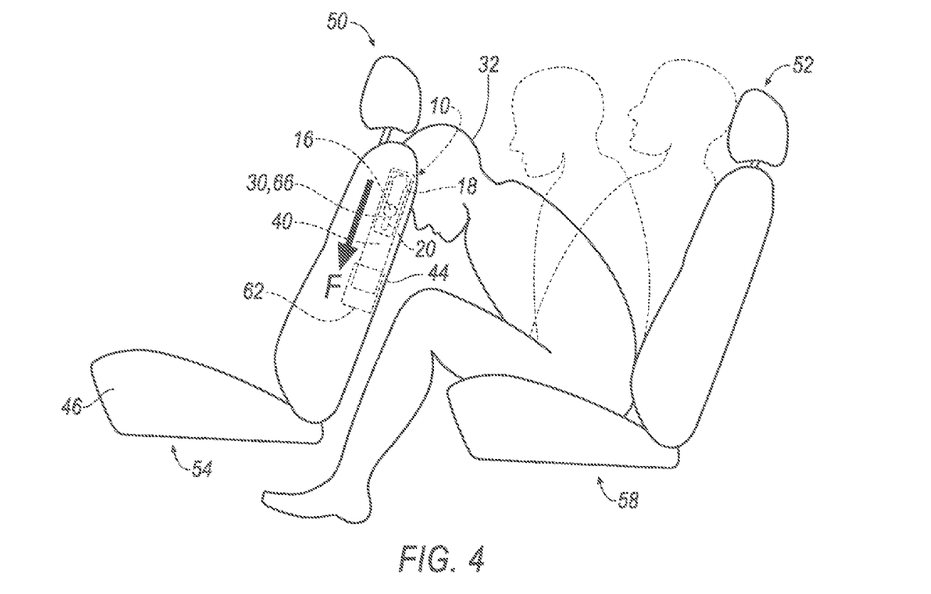
FIG. 4 is a side view of a head of the occupant moving toward the display assembly and exerting a force on the display assembly with the display assembly in a second position.

With reference to the Figures, wherein like numerals indicate like parts throughout the several views, FIGS. 1 and 2 show a display assembly 10 for a vehicle 12. The display assembly 10 includes an electronic display 14 and a rod 16 coupled to the electronic display 14. A guide 18 defines a slot 20 receiving the rod 16. The rod 16 is movable along the slot 20 from a first position, i.e., a base position, as shown in FIGS. 1-3, to a second position, i.e., a retracted position, as shown in FIG. 4. An energy absorption element 30, 130, 230, 330, 430 is disposed along the slot 20 and is deformable by the rod 16 when the rod 16 moves from the first position to the second position.

As shown in FIG. 3, an occupant 32 may be seated in front of the display assembly 10. As shown in FIG. 4, the occupant 32 may move toward the display assembly 10 and may contact the display assembly 10, for example, during a frontal impact of the vehicle 12. The occupant 32, e.g., a head of the occupant 32, may move toward the display assembly 10 and contact the display assembly 10 in a downward motion. As the occupant 32 continues to move in the downward motion, the occupant 32 exerts a force F on the display assembly 10. As set forth below, if the force F exceeds a predetermined force, the rod 16 moves from the first position to the second position while deforming the energy absorption element 30, as shown in FIG. 4. As the energy absorption element 30, 130, 230, 330, 430 deforms, the energy absorption element 30, 130, 230, 330, 430 absorbs energy from the occupant 32. In addition, movement of the display assembly 10 from the first position to the second position provides increased travel space for the occupant 32, e.g., the head of the occupant 32.

Figure 5A:
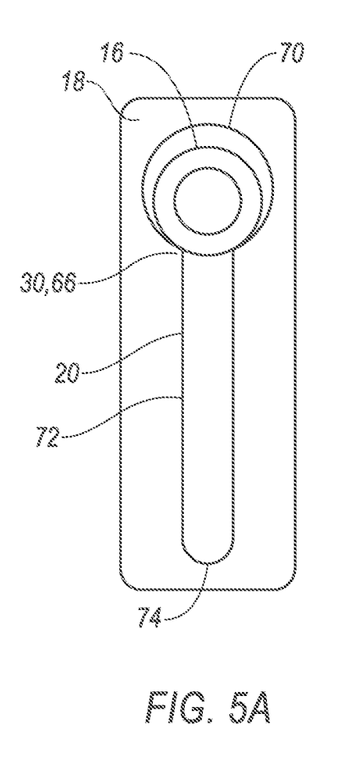
FIG. 5A is a side view of a first embodiment of an energy absorption element showing a neck supporting a rod in the first position.
Figure 5B:
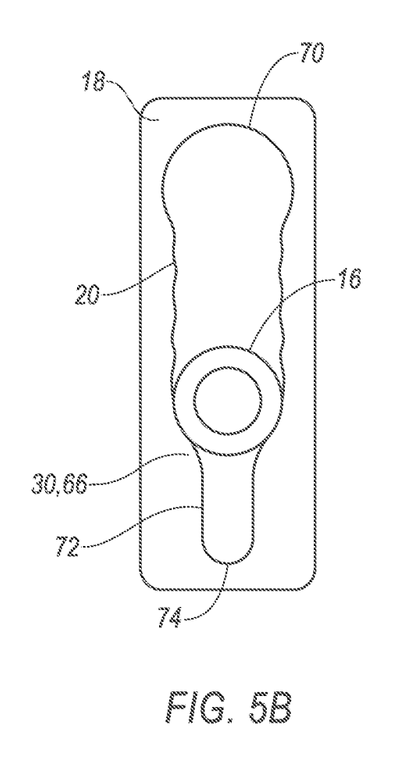
FIG. 5B is a side view of the first embodiment of the energy absorption element showing the rod in the second position deforming the neck.
Figure 6A:
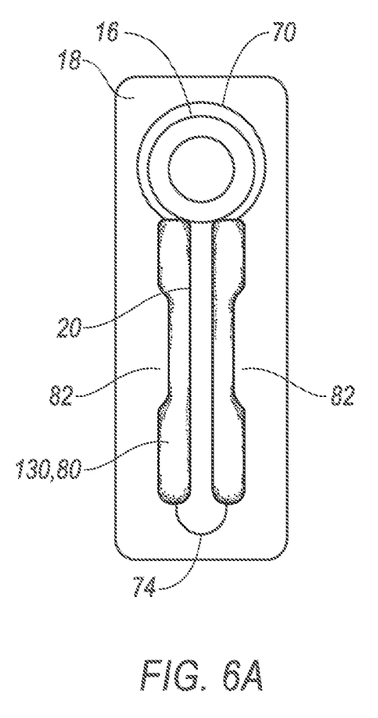
FIG. 6A is a side view of a second embodiment of an energy absorption element including an insert supporting the rod in the first position.
Figure 6B:
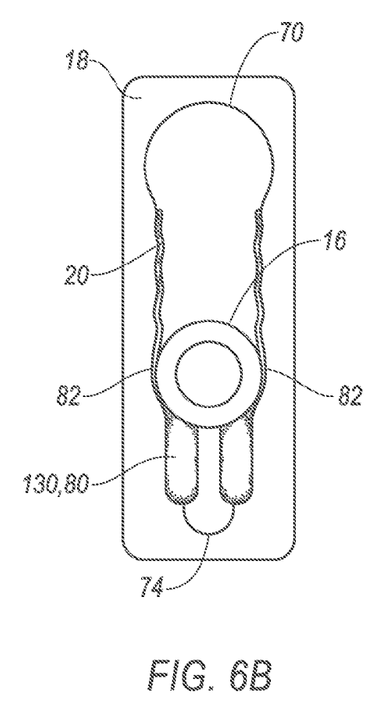
FIG. 6B is a side view of the second embodiment of the energy absorption element with the rod in the second position after deforming the insert.
Figure 7A:
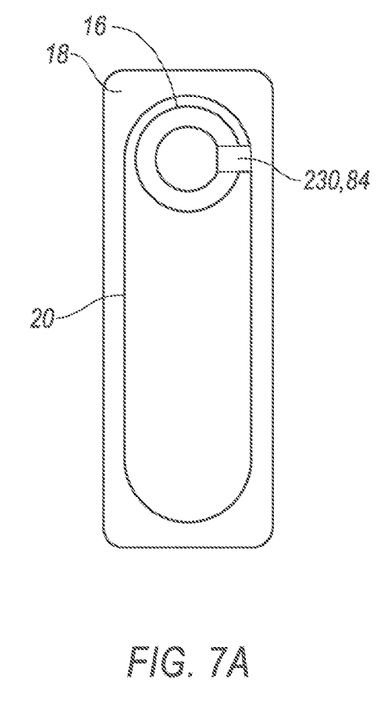
FIG. 7A is a side view of a third embodiment of an energy absorption element including a shear pin supporting the rod in the first position.
Figure 7B:
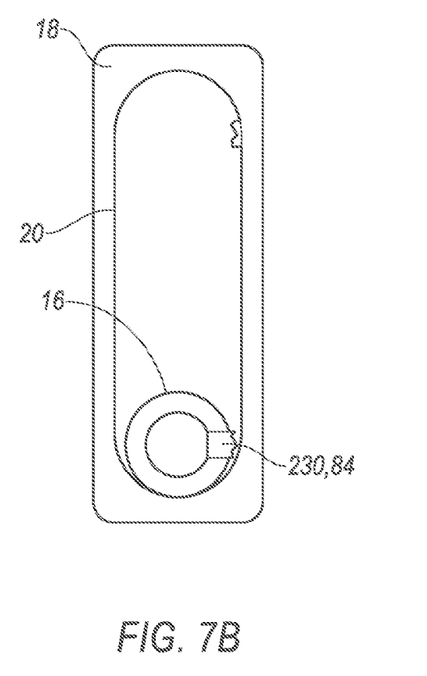
FIG. 7B is a side view of the third embodiment of the energy absorption element with the rod in the second position after deforming the shear pin.
Figure 8A:
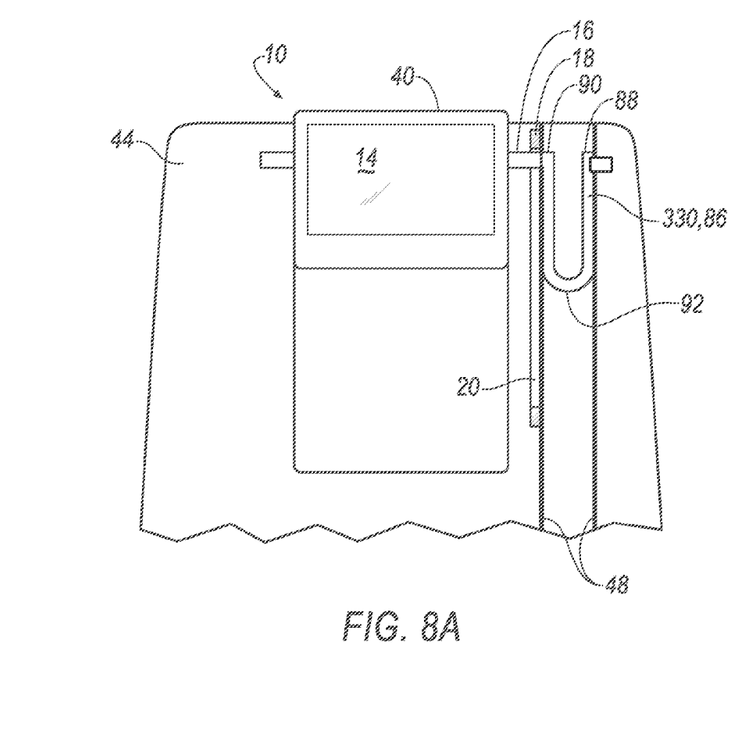
FIG. 8A is a rear view of the seat back with the guide in cross-section where portions of the seat back and trim have been removed exposing a fourth embodiment of an energy absorption element including a bend strap supporting the rod in the first position.
Figure 8B:
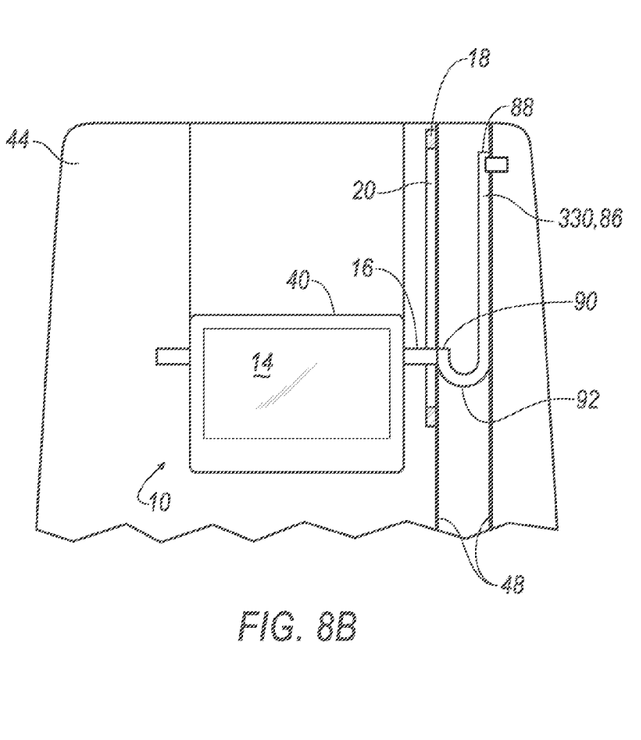
FIG. 8B is a rear view of the seat back of FIG. 8A with the rod in the second position after deforming the bend strap.
Figure 9A:
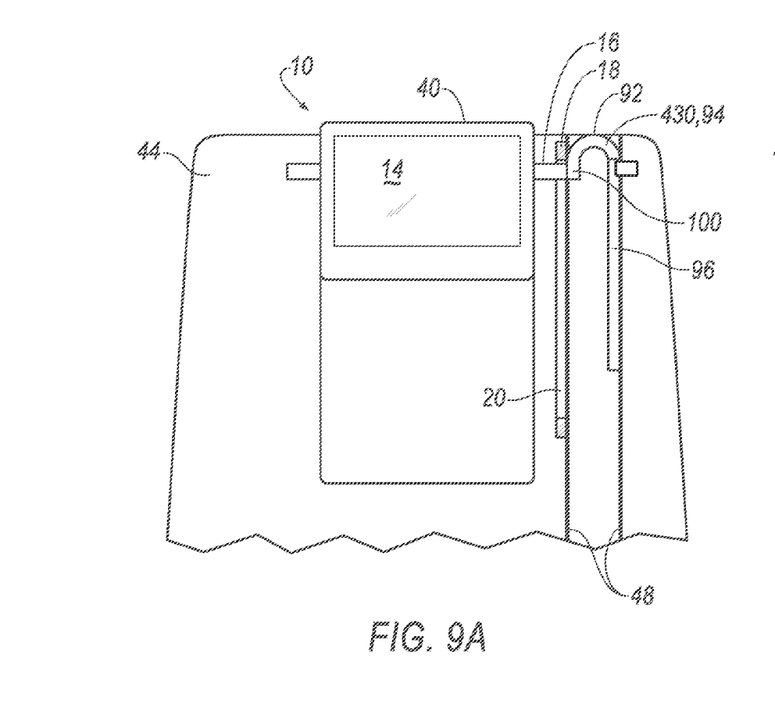
FIG. 9A is a rear view of the seat back with the guide in cross-section where portions of the seat back and trim have been removed exposing a fifth embodiment of an energy absorption element showing a tear strip supporting the rod in the first position.
Figure 9B:
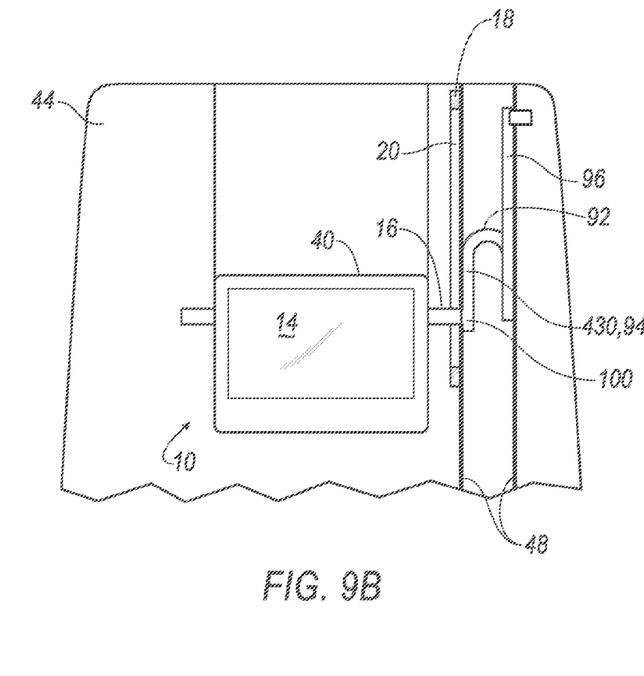
FIG. 9B is a rear view of the seat back of FIG. 9A with the rod in the second position after deforming the tear strip.
Figure 10A:
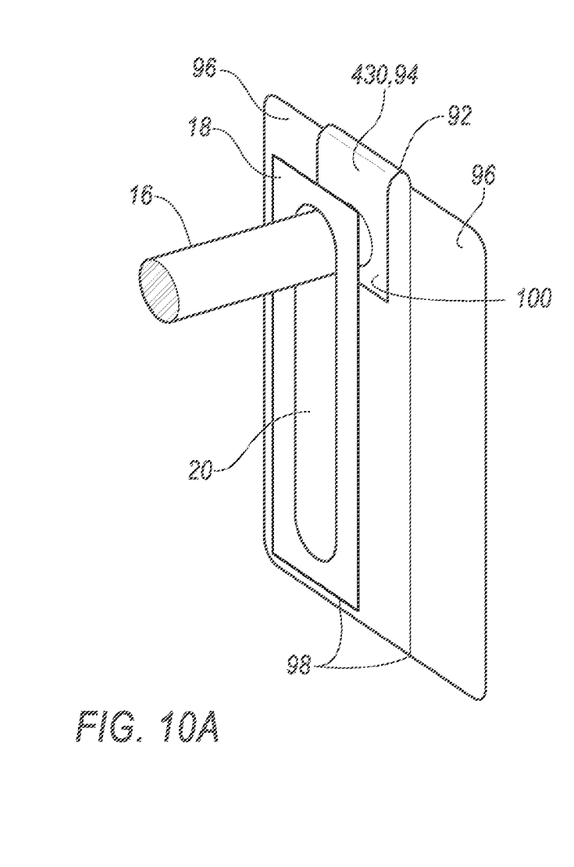
FIG. 10A is a perspective view of the rod in the first position, the tear strip, the guide and the slot.
Figure 10B:
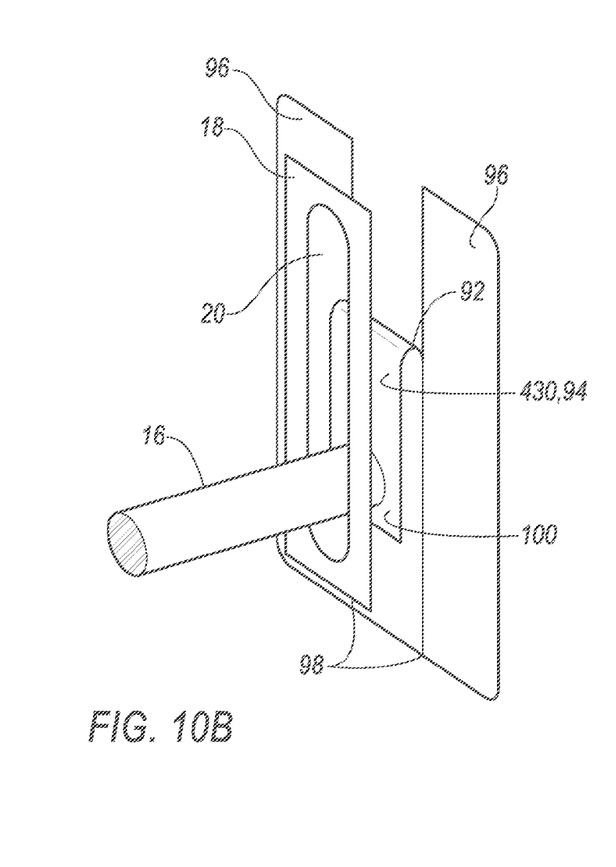
FIG. 10B is a perspective view of the rod in the second position, the tear strip, the guide and the slot.
Figure 11:
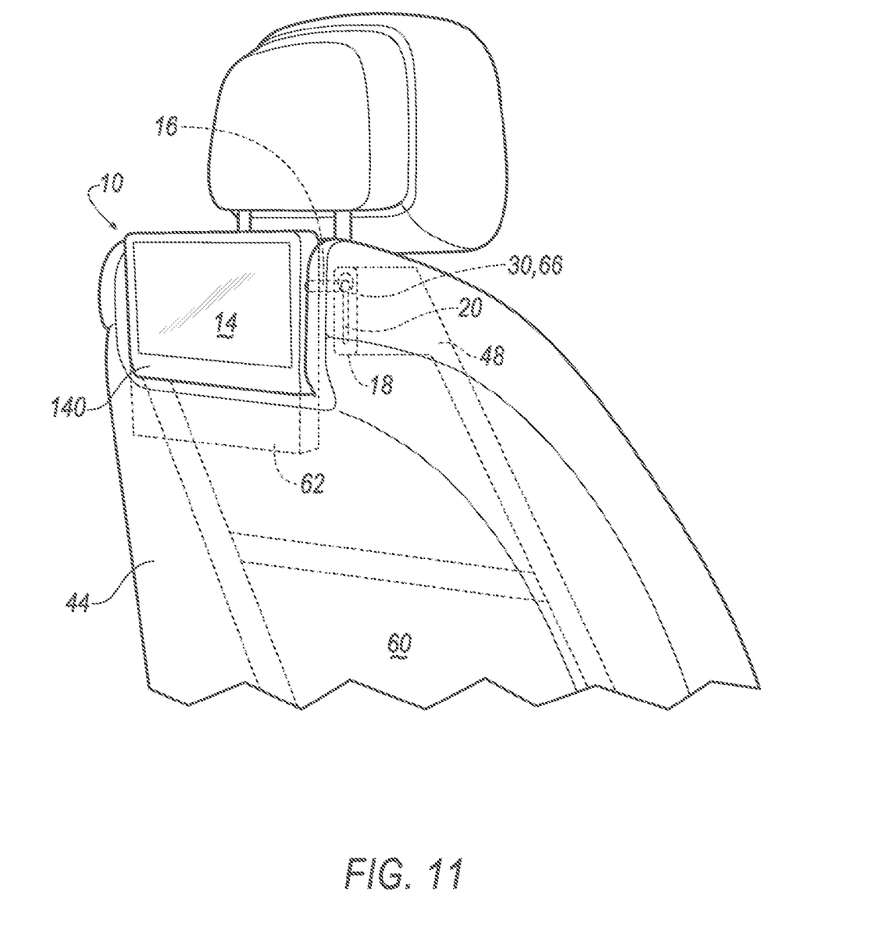
FIG. 11 is a perspective view of a second embodiment of a housing of the display assembly in the viewing position.

As set forth further below, a first embodiment of the energy absorption element 30 is shown in FIGS. 1-5B and 11, a second embodiment of the energy absorption element 130 is shown in FIGS. 6A-B, a third embodiment of the energy absorption element 230 is shown in FIGS. 7A-B, a forth embodiment of the energy absorption element 330 is shown in FIGS. 8A-B, and a fifth embodiment of the energy absorption element 430 is shown in FIGS. 9A-10B. The first embodiment of the energy absorption element 30 is shown in FIGS. 1-4 for exemplary purposes and it should be appreciated that the second, third, fourth, and fifth embodiments of the energy absorption element 130, 230, 330, 430 may be used in the alternative to the energy absorption element 30 in FIGS. 1-4. As set forth further below, a first embodiment of a housing 40 of the display assembly 10 is shown in FIGS. 1-4, 8A-9B, and a second embodiment of the housing 140 of the display assembly 10 is shown in FIG. 11. Common numerals are used to identify common features in the various embodiments.

The display assembly 10 may include one or more guides 18. For example, as shown in FIG. 2, the display assembly 10 includes two guides 18. As another example, as shown in FIGS. 8A-9B, the display assembly 10 includes one guide 18. Any one of the embodiments disclosed herein may include any suitable number of guides 18. Each guide 18 may include the slot 20 and the energy absorption element 30, 130, 230, 330, 430, e.g., may be mirror images of each other. Each guide 18 may be spaced from each other along an axis of the rod A.

The guide 18 may be formed of any suitable material, e.g., metal such as steel, aluminum, etc. Alternatively, for example, the guide 18 may be formed of an engineered plastic, e.g., acrylonitrile butadiene styrene (ABS), sheet molding compound (SMC) composites, etc.

With reference to FIGS. 1-4, the vehicle 12 may include a seat back 44 and a seat bottom 46. The display assembly 10 may be supported by the seat back 44. Specifically, as shown in FIG. 1, the seat back 44 may include a frame 48 and the guide 18 may be attached to the frame 48, e.g., fixed to the frame 48. For example, the guide 18 may be welded and/or bolted to the frame 48.

With reference to FIGS. 3-4, the vehicle 12 may include a front seat 50 and a rear seat 52, and the display assembly 10 may be supported on the seat back 44 of the front seat 50. The vehicle 12 may include any suitable number of seats, i.e. one or more, and the seats may be in any position. The vehicle 12 may include any suitable number of rows of seats in any suitable position, e.g., a front row 54, a middle row (not shown), a rear row 58, etc. In any event, one or more display assemblies 10 may be supported by one or more of the seat backs 44. The vehicle 12 may be of any suitable type, e.g. a car, truck, SUV, etc.

As shown in FIG. 1, the seat back 44 may include trim 60 supported by the frame 48. At least a portion of the trim 60 may define a cavity 62 that receives the electronic display 14 as the rod 16 travels from the first position to the second position. The trim 60 may cover the cavity 62 below the electronic display 14 and may break away so that the cavity 62 may receive the electronic display 14 as the rod 16 travels from the first position to the second position.

With reference to FIG. 2, a cover 64 may be supported by the trim 60 along the slot 20 to conceal components of the display assembly 10, e.g., the rod 16, guide 18, energy absorption element 30, 130, 230, 330, 430, etc. The cover 64 may be configured to provide a force opposing the force F as the rod 16 travels along the slot 20 from the first position, as shown in FIGS. 1-3, to the second position, as shown in FIG. 4.

The trim 60 may be formed of any suitable material such as a polymer, e.g., nylon, plastic, polypropylene (PP), acrylonitrile butadiene styrene (ABS), vinyl, etc. The cover 64 may be formed of any suitable material, e.g. nylon, plastic, rubber, metal, etc. The frame 48 may be metal, e.g. steel, aluminum, etc.

The rod 16 may be rigid relative to the energy absorption element 30, 130, 230, 330, 430, and may be formed of any suitable material, e.g., metal such as steel, aluminum, etc. Alternatively, for example, the rod 16 may formed of an engineered plastic, e.g. acrylonitrile butadiene styrene (ABS), sheet molding compound (SMC) composites, etc. The rod 16 may have any suitable solid cross-sectional shape, e.g. circular (FIGS. 1-4), oval, rectangular, rounded rectangular, etc. The rod 16 may be hollow as shown, for example, in FIGS. 5A-7B or may be solid as shown, for example, in FIGS. 10A-10B.

The electronic display 14 may be of any suitable type for displaying images and/or video, e.g., entertainment, informational, navigational, etc. The electronic display 14 may be of any suitable type, for example, a liquid crystal (LCD) display, light emitting diode (LED) display, etc. The electronic display 14 may include one or more input features, e.g., touch screen, buttons, knobs, etc., for inputting and/or selecting data. The electronic display 14 may also include audio speakers.

As set forth above, the electronic display 14 is coupled to the rod 16. For example, as shown in FIG. 2, the electronic display 14 may be mounted to a housing 40. The electronic display 14 may be fixed to the housing 40, 140, and the housing 40, 140 may extend around a periphery of the electronic display 14. The housing 40, 140 may support the electronic display 14 on the rod 16 and may house components of the electronic display 14, e.g., wires, electronic circuitry, etc. For example, the housing 40, 140 may include sleeves that receive the rod 16 along the axis of the rod A. The housing 40, 140 may, for example, be formed of any suitable material such as a polymer, e.g., nylon, plastic, polypropylene (PP), acrylonitrile butadiene styrene (ABS), vinyl, etc.

The electronic display 14 may be movable between a stowed position, as shown in FIG. 1, and a viewing position, as shown in FIG. 2. For example, as shown in FIGS. 1 and 2, the electronic display 14 may be rotatable about the axis A of the rod 16 between the stowed position and the viewing position. In such a configuration, the rod 16 may move from the first position to the second position and deform the energy absorbing element 30. 130, 230, 330, 430, as set forth above, when the electronic display 14 is in the stowed position and/or the viewing position. Alternatively, or in addition to rotation, the electronic display 14 may move translationally relative to the seat back 44 between the stowed position and the viewing position. Alternatively, as shown in FIG. 11 and discussed further below, the housing 40, 140 may be fixed relative to the seat back 44 in the viewing position.

The housing 40, 140 and the electronic display 14 may, for example, move together as a unit relative to the seat back 44 between the stowed position and the viewing position. For example, as shown in FIGS. 1 and 2, the housing 40 and the electronic display 14 may rotate together as a unit about the axis A of the rod 16. As shown in FIG. 1, in the stowed position, the electronic display 14 is disposed between, i.e., sandwiched between, the housing 40 and the seat back 44. As shown in FIG. 2, in the viewing position, the electronic display 14 may be exposed for viewing by the occupant 32.

With reference to FIG. 2, for example, the electronic display 14 and the housing 40 may be fixed relative to the rod 16 and the rod 16 may be rotatable relative to the guide 18 about the axis A of the rod 16 between the stowed position and the viewing position. As another example, the rod 16 may be rotationally fixed relative to the guide 18 and the electronic display 14 and the housing 40 may rotate relative to the rod 16 about the axis A of the rod 16 between the stowed position and the viewing position.

As set forth above, the first embodiment of the energy absorption element 30 is shown in FIGS. 1-5B. With reference to FIGS. 5A-5B, the energy absorption element 30 may be a neck 66 in the slot 20 of the guide 18. Specifically, the slot 20 may include an enlarged portion 70 adjacent the neck 66. The enlarged portion 70 of the slot 20 receives the rod 16 when the rod 16 is in the first position, as shown in FIG. 5A. A thin portion 72 of the slot 20 extends from the neck 66 to a terminal end 74. The neck 66 may extend from the enlarged portion 70 to the terminal end 74 of the slot 20.

The rod 16 may be supported on the neck 66 in the first position, as shown in FIG. 5A. The neck 66 may be configured to support the rod 16 in the first position in the absence of a force F exceeding the predetermined force. For example, the neck 66 may be formed of a suitable thickness for supporting the rod 16 in the first position.

The neck 66 may be the same thickness or a different thickness than the rest of the guide 18. The neck 66 may be integrally formed with the rest of the guide 18, i.e., formed simultaneously as a single continuous unit. Alternatively, the neck 66 may be formed separately from the rest of the guide 18 and subsequently fixed to the rest of the guide 18, e.g., by welding, bonding, fastening, etc. Whether formed integrally with or separately from the rest of the guide 18, the neck 66 may be formed of a first material and the guide 18 may be formed of a second material different from the first material. The neck 66, for example, may be formed of any suitable first material, e.g., metal such as steel, aluminum, etc. Alternatively, the neck 66 may be formed of an engineered plastic, e.g., acrylonitrile butadiene styrene (ABS), sheet molding compound (SMC) composites, etc.

As set forth above, when the occupant 32 exerts a force F on the display assembly 10 exceeding a predetermined force, the rod 16 moves from the first position, as shown in FIG. 5A, to the second position, as shown in FIG. 5B. As rod 16 moves toward the second position, the rod 16 deforms the neck 66 to absorb energy from the occupant 32. As shown in FIG. 5B, the rod 16 may plastically deform the neck 66 as the rod 16 moves from the first position to the second position, i.e., the neck 66 may be plastically deformable relative to the rod 16. Alternatively, the rod 16 may elastically deform the neck 66 as the rod 16 moves from the first position to the second position, i.e., the neck 66 may be elastically deformable relative to the rod 16.

As set forth above, the energy absorption element 30 is disposed along the slot. In other words, in the first embodiment, the neck 66 defines the slot 20 from the enlarged portion 70 to the terminal end 74 of the slot 20.

As set forth above, the second embodiment of the energy absorption element 130 is shown in FIGS. 6A-6B. Specifically, the energy absorbing element 130 may be an insert 80 fixed to the guide 18 in the slot 20.

The insert 80 may be formed of any suitable material. For example, the insert 80 may be an expanded polypropylene (EPP) foam, or expanded polystyrene (EPS) foam molded to fit within the slot 20, etc. The insert 80 may be integrally formed with the guide 18, i.e., formed simultaneously as a single continuous unit. For example, the insert 80 and the guide 18 may be co-molded. Alternatively, or the guide 18 and the insert 80 may be formed separately and subsequently fixed together, e.g., the insert 80 may be overmolded onto the guide 18.

As shown in FIG. 6A, the insert 80 may support the rod 16 in the first position. The insert 80 may be configured to support the rod 16 in the first position in the absence of a force F exceeding the predetermined force. For example, the insert 80 may be formed of a suitable material and thickness for supporting the rod 16 in the first position.

As set forth above, when the occupant exerts a force F on the display assembly 10 exceeding a predetermined force, the rod 16 moves from the first position, as shown in FIG. 6A, to the second position, as shown in FIG. 6B. As rod 16 moves toward the second position, the rod 16 deforms the insert 80 to absorb energy from the occupant 32. As shown in FIG. 6B, the rod 16 may plastically deform the insert 80 as the rod 16 moves from the first position to the second position, i.e., the insert 80 may be plastically deformable relative to the rod 16. Alternatively, the rod 16 may elastically deform the insert 80 as the rod 16 moves from the first position to the second position, i.e., the insert 80 may be elastically deformable relative to the rod 16. As shown in FIG. 6A, the guide 18 may include extensions 82 that extend into the slot 20. As shown in FIG. 6B, the rod 16 may deform the extensions 82, along with the insert 80, as the rod 16 moves from the first position to the second position. The size, shape, and thickness of the insert 80 and the extensions 82 may be tuned to absorb energy when the rod 16 moves from the first position to the second position.

As set forth above, the energy absorption element 130 is disposed along the slot 20. In other words, in the second embodiment, the insert 80 may extend into the slot 20 between the enlarged portion 70 and the terminal end 74. For example, as shown in FIGS. 6A-B, the insert 80 may extend along the slot 20 from the enlarged portion 70 toward the terminal end 74 of the slot 20.

As set forth above, the third embodiment of the energy absorption element 230 is shown in FIGS. 7A-7B. Specifically, the energy absorption element 230 may be a shear pin 84. With reference to FIG. 7A, the shear pin 84 may fixed to the guide 18 and the rod 16 in the slot 20 and may couple the guide 18 to the rod 16 when the rod 16 is in the first position.

The rod 16 may be supported by the shear pin 84 in the first position as shown in FIG. 7A. The shear pin 84 may be configured to support the rod 16 in the first position in the absence of a force F exceeding the predetermined force. For example, the shear pin 84 may be formed of a suitable material and thickness for supporting the rod 16 in the first position.

The shear pin 84 may be integrally formed with the guide 18, i.e., formed simultaneously as a single continuous unit. Alternatively, the shear pin 84 may be formed separately from the guide 18 and subsequently fixed to the guide 18, e.g., by welding, bonding, fastening, etc. The shear pin 84 may be engaged with the rod 16, e.g., by welding, bonding, fastening, etc.

The shear pin 84 may be formed of a first material and the guide 18 may be formed of a second material different from the first material. The shear pin 84 may be formed of any suitable material, e.g., metal such as steel, aluminum, etc. Alternatively, for example, the shear pin 84 may be formed of nylon, plastic, polyoxymethylene (POM), etc.

As set forth above, when the occupant exerts a force F on the display assembly 10 exceeding a predetermined force, the shear pin 84 may fracture causing the rod 16 to move from the first position, as shown in FIG. 7A, to the second position, as shown in FIG. 7B. As the shear pin 84 fractures, the shear pin 84 absorbs energy from the occupant 32. As the rod 16 initially moves from the first position toward the second position, the shear pin 84 may plastically deform.

As set forth above, the energy absorption element 230 is disposed along the slot 20. In other words, in the third embodiment, the shear pin 84 extends from the guide 18 into the slot 20. The shear pin 84 may extend along any length of the slot 20.

As set forth above, the fourth embodiment of the energy absorption element 330 is shown in FIGS. 8A-8B. The energy absorption element 330 may be a bend strap 86. The bend strap 86 may include a first end 88 fixed to the frame 48 and a second end 90 spaced from the first end 88 and fixed to the rod 16. The bend strap 86 may couple the rod 16 to the frame 48 and may form a loop 92 between the guide 18 and the frame 48, as shown in FIGS. 8A-8B. The rod 16 may be supported by the bend strap 86 in the first position as shown in FIG. 8A. The bend strap 86 may be configured to support the rod 16 in the first position in the absence of a force F exceeding the predetermined force. For example, the bend strap 86 may be formed of a suitable material, thickness and width for supporting the rod 16 in the first position. Additionally, the bend strap 86 may be designed to oppose the force F which exceeds the predetermined force as the rod 16 travels along the slot 20 from the first position, as shown in FIG. 8A, to the second position, as shown in FIG. 8B.

The bend strap 86 may be integrally formed with the frame 48, i.e., formed simultaneously as a single continuous unit. Alternatively, for example, the bend strap 86 may be formed separately from the frame 48 and subsequently fixed to the frame 48, e.g., by welding, bonding, fastening, etc. The bend strap 86 may be engaged with the rod 16, e.g., by welding, bonding, fastening, etc.

The bend strap 86 may be formed of the same type of material as the guide 18 or may be formed of any suitable material. For example, the bend strap 86 may be metal such as steel, aluminum, etc.

When the occupant 32 exerts a force F on the display assembly 10 exceeding a predetermined force, the bend strap 86 may bend causing the rod 16 to move from the first position, as shown in FIG. 8A, to the second position, as shown in FIG. 8B. As rod 16 moves toward the second position, the rod 16 bends the bend strap 86 to absorb energy from the occupant 32. As shown in FIG. 8B, the rod 16 may plastically deform the bend strap 86 as the rod 16 moves from the first positon to the second position, i.e., the bend strap 86 may be plastically deformable relative to the rod 16. Alternatively, the rod 16 may elastically deform the bend strap 86 as the rod 16 moves from the first position to the second position, i.e., the bend strap 86 may be elastically deformable relative to the rod 16. Additionally, as the rod 16 moves from the first position to the second position, occupant travel space is increased.

As set forth above, the energy absorption element 330 is disposed along the slot 20. For example, in the fourth embodiment, the bend strap 86 may be spaced from the guide 18 and the slot 20. The bend strap 86 shown in FIGS. 8A-8B, for example, extends in parallel with the slot 20 spaced from the guide 18 and the slot 20.

As set forth above, the fifth embodiment of the energy absorption element 430 is shown in FIGS. 9A-10B. The energy absorption element 430 may be a tear strip 94. For example, a plate 96 may define the tear strip 94 and may be fixed to the frame 48 adjacent the guide 18. The tear strip 94, for example, may be defined by grooves 98 in the plate 96. The grooves 98 may be thinner than the rest of the plate 96 in cross-section to encourage the tear strip 94 to break along the grooves 98 when a force F exceeding the predetermined force is applied to the rod 16. The grooves 98 may, for example, be machined in the plate 96 or may be formed during formation of the plate 96. As shown in FIGS. 9A-10B, the plate 96 may be spaced from the guide 18. The grooves 98 may extend parallel to the slot 20.

The tear strip 94 may include a tab 100 fixed to the rod 16. The tear strip 94 may couple the rod 16 to the frame 48 and may form a loop 92 between the guide 18 and the frame 48, as shown in FIGS. 9A-10B.

The rod 16 may be supported by the tear strip 94 in the first position as shown in FIGS. 9A and 10A. The tear strip 94 and/or grooves 98 may be configured to support the rod 16 in the first position in the absence of a force F exceeding the predetermined force. For example, the tear strip 94 and/or the grooves 98 may be formed of a suitable material, thickness and width for supporting the rod 16 in the first position. Additionally, the tear strip 94 may be designed to oppose the force F which exceeds the predetermined force as the rod 16 travels along the slot 20 from the first position, as shown in FIGS. 9A and 10A, to the second position, as shown in FIGS. 9B and 10B. The plate 96 may be integrally formed with the frame 48, i.e., formed simultaneously as a single continuous unit. Alternatively, as shown in FIGS. 9A-9B, the plate 96 may be formed separately from the frame 48 and subsequently fixed to the frame 48, e.g., by welding, bonding, fastening, etc. The tear strip 94 may be engaged with the rod 16, e.g., by welding, bonding, fastening, etc.

The tear strip 94 may be formed of the same type of material as the guide 18 or may be formed of any suitable material. For example, the tear strip 94 may be metal such as steel, aluminum, etc.

As set forth above, when the occupant 32 exerts a force F on the display assembly 10 exceeding a predetermined force, the tear strip 94 may tear along the grooves 98 and the rod 16 may move from the first position, as shown in FIGS. 9A and 10A, to the second position, as shown in FIGS. 9B and 10B. As rod 16 moves toward the second position, the rod 16 tears the tear strip 94 to absorb energy from the occupant 32. As shown in FIG. 10B, the rod 16 may plastically deform the tear strip 94 as the rod 16 moves from the first position to the second position.

As set forth above, the energy absorption element 430 is disposed along the slot 20. For example, in the fifth embodiment, the tear strip 94 may be spaced from the guide 18 and the slot 20. The tear strip 94 shown in FIGS. 9A-10B, for example, extends in parallel with the slot 20 spaced from the guide 18 and the slot 20.

As set forth above, with reference to FIG. 11, the second embodiment of the housing 140 may be fixed relative to the seat back 44 in the viewing position. In other words, the housing 140 of the display assembly 10 is rotationally fixed relative to the seat back 44. Any of the five energy absorption element embodiments 30, 130, 230, 330, 430, as set forth above, may be configured for use with the electronic display 14 of FIG. 11.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A display assembly comprising:
   an electronic display;
   a rod coupled to the electronic display;
   a guide defining a slot receiving the rod, the rod being movable along the slot from a first position to a second position; and
   an energy absorption element disposed along the slot and being deformable by the rod when the rod moves from the first position to the second position.

2. The display assembly as set forth in claim 1, wherein the energy absorption element supports the rod in the first position.

3. The display assembly as set forth in claim 2, wherein the energy absorption element is configured to deform when a force on the rod along the slot exceeds a predetermined force.

4. The display assembly as set forth in of claim 1, wherein the rod extends along an axis and the electronic display is rotatable about the axis.

5. The display assembly as set forth in of claim 1, wherein the electronic display is rotatable relative to the guide.

6. The display assembly as set forth in of claim 1, wherein the rod is rigid relative to the energy absorption element.

7. The display assembly as set forth in of claim 1, wherein the energy absorption element includes a neck along the slot.

8. The display assembly as set forth in of claim 7, wherein the neck supports the rod in the first position.

9. The display assembly as set forth in of claim 1, wherein the energy absorption element is formed of a first material and the guide is formed of a second material different than the first material.

10. The display assembly as set forth in of claim 1, wherein the energy absorption element is configured to fracture when subjected to a force exceeding a predetermined force.

11. The display assembly as set forth in of claim 1, wherein the energy absorption element is configured to bend when subjected to a force exceeding a predetermined force.

12. The display assembly as set forth in of claim 1, wherein the energy absorption element is configured to tear when subjected to a force exceeding a predetermined force.

13. A vehicle seat back comprising:
a frame;
a guide fixed relative to the frame;
an electronic display;
a rod coupled to the electronic display;
the guide defining a slot receiving the rod, the rod being movable along the slot from a first position to a second position; and
an energy absorption element disposed along the slot and being deformable by the rod when the rod moves from the first position to the second position.

14. The vehicle seat back as set forth in claim 13, wherein the energy absorption element supports the rod in the first position.

15. The vehicle seat back as set forth in claim 14, wherein the energy absorption element is configured to deform when a force on the rod along the slot exceeds a predetermined force.

16. The vehicle seat back as set forth in claim 13, further comprising trim supported by the frame and defining a cavity receiving the electronic display when the rod is in the second position.

17. The vehicle seat back as set forth in claim 13, wherein the rod extends along an axis and the electronic display is rotatable about the axis.

18. The vehicle seat back as set forth in claim 13, wherein the electronic display is rotatable relative to the guide.

19. The vehicle seat back as set forth in claim 13, wherein the energy absorption element includes a neck along the slot.

20. The vehicle seat back as set forth in claim 19, wherein the neck supports the rod in the second position.

* * * * *